United States Patent
Gavoty et al.

(10) Patent No.: US 12,403,939 B2
(45) Date of Patent: Sep. 2, 2025

(54) DEVICE FOR CONTROLLING THE EMBARKING IN A CABLE TRANSPORT FACILITY

(71) Applicants: EIFFAGE METAL, Velizy-Villacoublay (FR); POMA, Voreppe (FR)

(72) Inventors: Simon Gavoty, Paris (FR); Stephane Coudurier, Saint Etienne de Crossey (FR); Adrien Meneguz, Sassenage (FR)

(73) Assignee: POMA, Voreppe (FR)

( * ) Notice: Subject to any disclaimer, the term of this patent is extended or adjusted under 35 U.S.C. 154(b) by 1064 days.

(21) Appl. No.: 17/292,115

(22) PCT Filed: Nov. 7, 2019

(86) PCT No.: PCT/EP2019/080601
§ 371 (c)(1),
(2) Date: Nov. 8, 2021

(87) PCT Pub. No.: WO2020/099244
PCT Pub. Date: May 22, 2020

(65) Prior Publication Data
US 2022/0055667 A1 Feb. 24, 2022

(30) Foreign Application Priority Data
Nov. 12, 2018 (EP) ..................... 18205793

(51) Int. Cl.
*B61B 1/02* (2006.01)
*B61B 12/02* (2006.01)
(Continued)

(52) U.S. Cl.
CPC .............. *B61B 1/02* (2013.01); *B61B 12/022* (2013.01); *G06V 20/593* (2022.01); *G07C 11/00* (2013.01); *G07C 2011/04* (2013.01)

(58) Field of Classification Search
CPC ................. G06V 20/593; B61B 1/02
See application file for complete search history.

(56) References Cited

U.S. PATENT DOCUMENTS

| | | | |
|---|---|---|---|
| 5,176,082 A | | 1/1993 | Chun et al. |
| 6,035,757 A | * | 3/2000 | Caluori ................. B23Q 17/24 83/520 |

(Continued)

FOREIGN PATENT DOCUMENTS

| | | |
|---|---|---|
| EP | 3009993 A1 | 4/2016 |
| FR | 2953476 A1 | 6/2011 |

(Continued)

*Primary Examiner* — Long T Tran
(74) *Attorney, Agent, or Firm* — Volpe Koenig

(57) ABSTRACT

The invention relates to a control device of a cable transport facility, comprising a controller capable of organizing an embarking period of a nominal duration (Tn_max) for vehicles at a station. This embarking period (Tn_max) ends with a prohibition of access to the vehicle. The controller comprises an input for receiving at least one variable representative of a vehicle occupancy. The controller is arranged to react upon receipt of such a variable during the embarking period (Tn_max) by comparing it to a threshold value and by triggering the prohibition of access to the vehicle in an anticipated manner and before the end of the embarking period (Tn_max) as a function of the result of the comparison between said variable and the threshold value.

19 Claims, 5 Drawing Sheets

(51) Int. Cl.
*G06V 20/59* (2022.01)
*G07C 11/00* (2006.01)

(56) References Cited

U.S. PATENT DOCUMENTS

| | | | | |
|---|---|---|---|---|
| 2001/0020429 | A1* | 9/2001 | Serrano | B61B 13/00 |
| | | | | 105/141 |
| 2004/0011240 | A1* | 1/2004 | Gabriel | B61B 1/02 |
| | | | | 104/173.1 |
| 2011/0226152 | A1* | 9/2011 | Mollet | B61B 12/10 |
| | | | | 104/173.1 |
| 2012/0103225 | A1* | 5/2012 | Gubler | B61B 12/002 |
| | | | | 700/297 |
| 2012/0245769 | A1* | 9/2012 | Creissels | B61B 12/022 |
| | | | | 701/19 |
| 2015/0278618 | A1 | 10/2015 | Nuscheler et al. | |
| 2016/0102490 | A1* | 4/2016 | Kobler | G06Q 50/40 |
| | | | | 700/9 |
| 2017/0232976 | A1* | 8/2017 | Schmidt | B61L 15/00 |
| | | | | 104/28 |
| 2018/0029613 | A1* | 2/2018 | Natter | B61B 1/02 |
| 2020/0167697 | A1* | 5/2020 | Tran | G06Q 10/02 |

FOREIGN PATENT DOCUMENTS

| | | |
|---|---|---|
| JP | H0558276 A | 3/1993 |
| JP | H06234363 A | 8/1994 |
| JP | 2009122863 A | 6/2009 |

* cited by examiner

DEVICE FOR CONTROLLING THE EMBARKING IN A CABLE TRANSPORT FACILITY

FILED OF THE INVENTION

The invention relates to a control device for a cable transport facility, in particular in an urban or peri-urban area.

BACKGROUND

Such a facility generally comprises two end stations, between which one or more cables are tensioned in order to at least haul passenger vehicles. Additional stations can be inserted between these end stations along the cable route. This is very often the case in urban or peri-urban areas.

It is important to be able to regulate the flow of passengers embarking and disembarking from the vehicles. This is not only to ensure that the facility operates in compliance with its dimensioning, but also to ensure that it is operated efficiently. Moreover, passenger comfort should be sought after. Finally, a maximum load must be complied with in each vehicle.

One specific feature of cable transport facilities of the type mentioned in the introduction hereto is that the displacement of all of the vehicles follows a loop or back-and-forth route, at least between the end stations. A certain vehicle distribution should be complied with on the line, or a certain timing should be complied with, in particular to prevent collisions between vehicles. In order to comply with this timing, embarkation and disembarkation at the station generally take place according to an imposed time period. In other words, every vehicle on the line is given the same time interval at the station during which passengers can embark and disembark from the vehicle.

The facility is generally equipped with a control device comprising at least one controller capable of organizing an embarking period for vehicles at the station. This embarking period ends with access to the vehicle being prohibited.

In fairly simple facilities, in particular in the mountains, a station is equipped with a platform, at least one section whereof is designed for passenger disembarkation and embarkation. On approaching this section, the doors of the vehicle open, conventionally by the mechanical action of a cam, marking the start of the embarking/disembarking period. On moving away from this section, the doors of the vehicle close, also by the mechanical action of a cam, marking the end of the embarking/disembarking period. Embarkation and disembarkation take place while the vehicle is moving, at a reduced speed, along the section of the platform. The embarking/disembarking period corresponds to the time taken by the vehicle to travel along the section of the platform.

In other facilities, the embarking and disembarking period can comprise stopping the vehicle at the station and opening then closing doors. Where appropriate, audible and/or visual warning signals can be emitted during this period.

Conventionally, passenger flows are regulated in cable transport facilities by operating staff. The role thereof essentially consists in prohibiting access to a vehicle when it is full, or encouraging users to embark in order to fill a vehicle. In most cases, the operating staff act on the basis of a brief visual check.

This manner of regulating passenger flows is incompatible with large-capacity vehicles or when the passenger flow increases. More specifically, in these two cases, the staff are generally unable to estimate the occupancy of a vehicle accurately enough to effectively regulate passenger flow. The task imposed on this staff is made even more complex at an intermediate station: in this case, the staff must count the number of passengers disembarking, or those remaining in the vehicle, to regulate the embarking passenger flow.

More importantly, this type of regulation requires a larger number of staff the longer the operating times or the higher the number of vehicles and/or stations. In some cases, this type of regulation is too expensive to consider, especially when the facility is located in an urban or peri-urban area.

In order to overcome this difficulty, a known solution, in particular from the European patent EP 3 009 993, involves organizing an embarking platform into one or more chambers, each chamber giving access to a respective vehicle. Passenger access to the chambers is controlled, for example by a turnstile, so that the capacity of each chamber can be adapted to that of the vehicle. These chambers allow the number of passengers who will be embarking on a vehicle to be accurately counted before they enter the vehicle in question.

Such a facility is especially effective when vehicles arrive at the embarking platform empty. Such a facility is difficult to implement at an intermediate station. Moreover, the chambers in question occupy a lot of space on the platform. Finally, these chambers are generally not well perceived by the passengers, in that they contribute to a feeling of discomfort.

An aerial cable transport facility is also known from the French patent FR 2 953 476, wherein passengers input their destination at the entrance to each station by means of a compulsory check-in device. A programmer centralizes these inputs over the entire facility and deduces therefrom, for each vehicle arriving at the station, the number of places available for embarking. A chamber is provided on each embarking platform, which can only be accessed by a number of passengers that corresponds to the places available.

This facility is very sensitive to possible errors when entering the destinations. There are no redundancy devices in the facility for correcting possible deviations from the reality. Furthermore, the deduction of the number of places available does not take into account the volume actually occupied by the passengers inside the vehicle, nor the overall weight of these passengers.

The purpose of the invention is to improve this situation.

SUMMARY

The invention proposes a control device for a cable transport facility of the type comprising at least one controller capable of organizing an embarking period of a nominal duration for vehicles at a station, this embarking period ending with access to the vehicle being prohibited. The controller comprises an input for receiving at least one variable representative of a vehicle occupancy. The controller is arranged to react to the receipt of such a variable during the embarking period by comparing it with a threshold value and by triggering the prohibition on access to the vehicle in advance, before the end of the embarking period, as a function of the result of the comparison between said variable and the threshold value.

The proposed device allows flows of passengers embarking/disembarking from vehicles of the facility to be regulated in a simple and effective manner, without modifying the embarking platform, and in a way that increases passenger comfort.

As a function of the result of the comparison between the variable representing vehicle occupancy and the threshold value, for example if this variable comprises an occupancy value that is greater than the threshold value, access can be prohibited in advance, during the embarking period. This results in passengers no longer being able to embark, before the end of the embarking period. The number of passengers inside the vehicle is thus regulated. As long as the occupancy value in question remains below the threshold value, passengers can embark until the end of the embarking period. The embarking period is determined by the timing of the vehicles on the line. The embarking period can comply with a nominal time delay, resulting from the timing of the vehicles on the line, while at the same time prohibiting access to the vehicle in advance.

Preferably, the embarking period occurs according to a first time delay and, when the controller prohibits access in advance during the first time delay, the machine organizes a waiting time of a determined duration after this prohibition on access, the duration of the waiting time being determined as a function of this advance. Where appropriate, the duration of the waiting time can be provided such that it corresponds to said advance from which is deducted, where appropriate, a delay in the execution of the prohibit access sequence.

In practice, it is ensured that at the end of the waiting time, the machine checks that a start condition has been satisfied, and preferably generates a start command.

The threshold value can be lower than a maximum capacity value of the vehicle, in order to ensure passenger comfort.

The prohibition on access to the vehicle, when triggered in advance, can be similar to a prohibition triggered at the end of the embarking period.

The passengers thus do not perceive any advancement, thus avoiding any concerns about potential overloading of the vehicle, as well as the inconvenience of physical counting or specific platform arrangements.

The invention further proposes a cable transport facility of the type comprising vehicles and at least one station, the facility further comprising a controller capable of organizing an embarking period of a nominal duration for the vehicles at said station. This embarking period ends with access to the vehicle being prohibited. The controller comprises an input for receiving at least one variable representative of a vehicle occupancy. The controller is arranged to react to the receipt of such a variable during the embarking period by comparing it with a threshold value and by triggering the prohibition on access to the vehicle in advance, before the end of the embarking period, as a function of the result of the comparison between said variable and the threshold value.

The invention further proposes a method for controlling a cable transport facility, wherein an embarking period of a nominal duration is organized for vehicles at a station, this embarking period ending with access to the vehicle being prohibited. The method comprises the following steps of:

receiving at least one variable representative of a vehicle occupancy;

reacting to the receipt of such a variable during the embarking period by comparing it with a threshold value and by triggering the prohibition on access to the vehicle in advance, before the end of the embarking period, as a function of the result of the comparison between said variable and the threshold value.

The invention further proposes a device for controlling a transport facility of the type comprising at least one controller capable of organizing an embarking period for at least one vehicle at a station prior to the departure of the vehicle at a predetermined moment in time, this embarking period ending with access to the vehicle being prohibited and being followed by the departure of the vehicle at said predetermined moment in time. The controller comprises an input for receiving at least one variable representative of a vehicle occupancy, and is arranged to react to the receipt of said variable during the embarking period by comparing it with a threshold value and by triggering the prohibition on access to the vehicle in advance, before the end of the embarking period, as a function of the result of the comparison between said variable and the threshold value.

Finally, the invention proposes a method for controlling a transport facility, wherein an embarking period is organized for at least one vehicle at a station prior to the departure of the vehicle at a predetermined moment in time, this embarking period ending with access to the vehicle being prohibited and being followed by the departure of the vehicle at said predetermined moment in time. In practice, at least one variable representing an occupancy of the vehicle is received, and a reaction to the receipt of said variable is implemented during the embarking period by comparing it with a threshold value and by triggering the prohibition on access to the vehicle in advance, before the end of the embarking period, as a function of the result of the comparison between said variable and the threshold value.

BRIEF DESCRIPTION OF THE DRAWINGS

Other features and advantages of the invention will become apparent upon examining the detailed description provided hereinbelow, and from the accompanying drawings in which.

DETAILED DESCRIPTION OF THE PREFERRED EMBODIMENTS

The accompanying drawings contain elements of a certain character. They can be used not only to complement the invention, but also to contribute to the definition thereof, where appropriate.

Figure 1:
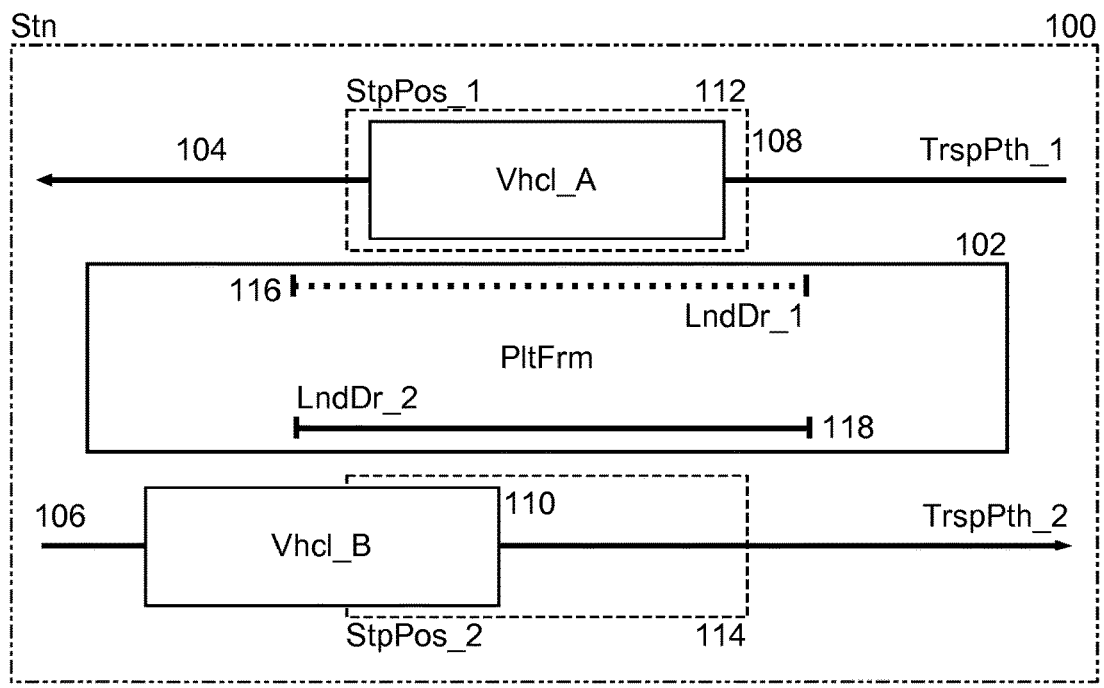
FIG. 1 is a diagram showing a portion of a cable transport facility.

Reference is now made to FIG. 1.

It shows a facility of a cable transport system, of the cable car, cable railway or similar type, in the form of a portion of station 100.

The station 100 comprises an elongate platform 102 which extends along a part of, and between, a first transport path 104 and a second transport path 106 of the system. The system comprises vehicles suitable for transporting passengers, in this case a first vehicle 108 and a second vehicle 110. These vehicles are capable of passing through the station 100 using the first path 104, such as the first vehicle 108, or the second path 106, such as the second vehicle 110.

On the first path 104 and the second path 106, vehicle movement is organized in mutually opposite directions. The first vehicle 108 moves from right to left in FIG. 1, whereas the second vehicle 110 moves from left to right in this figure.

In the station 100, one or more sections of the elongate platform 102 are arranged as terminals for embarking and/or disembarking passengers on/from the vehicles. Each terminal corresponds to an area for passengers to embark on one or more vehicles and/or to disembark therefrom. In this case, each terminal corresponds to a vehicle stop position in the station 100.

In the example shown here, a first terminal, corresponding to a first stop position 112, is organized for the first path 104, whereas a second terminal, corresponding to a second stop position 114, is organized for the second path 106. The first vehicle 108 is shown here in the first stop position 112, whereas the second vehicle 110 is approaching the second stop position 114.

Each terminal here comprises a landing door arrangement, consisting of one or more door elements and installed on the platform 102 facing a respective stop position. In the example shown in FIG. 1, a first landing door arrangement 116 is located facing the first stop position 112, whereas a second landing door arrangement 118 is located facing the second stop position 114.

Each landing door arrangement can be controlled such that it switches between a first state, or open state, where the arrangement allows passenger access, from the platform 102, to a vehicle stopped in a respective stop position, and a second state, or closed state, where this arrangement prohibits such access.

In the example shown here, the first landing door arrangement 116 is shown in the open state thereof (dotted line), whereas the second landing door arrangement 118 is shown in the closed state thereof (solid line).

Figure 2:
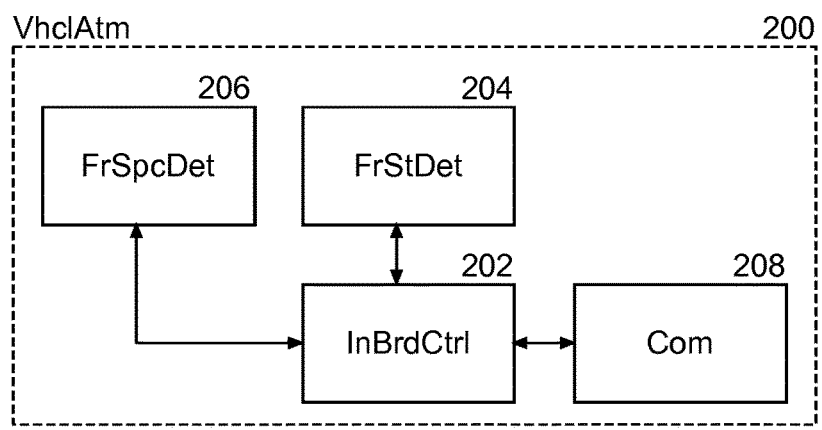
FIG. 2 is an operating diagram of a vehicle automation system intended to be used, for example, in the facility shown in FIG. 1.

Reference is now made to FIG. 2.

It shows one example of an automatic control system intended to be used in vehicles of a cable transport facility, for example the first vehicle 108 and the second vehicle 110 in FIG. 1.

The vehicle automation system 200 comprises an on-board controller 202. The vehicle automation system 200 here further comprises a module for detecting unoccupied seats, or FrStDet module 204, connected to the on-board controller 202 and capable of transmitting thereto a value representative of a number of free seats in the cabin of the vehicle. The cabin corresponds to the sub-assembly of the vehicle in which the passengers are physically located. The cabin can be organized for seating and/or standing places. One or more inputs of the FrStDet module 204 can be connected to the output of one or more devices from the group consisting of weighing devices installed in the seats, dry contacts disposed in the seats, an optical sensor, an image capture device associated with an image processing circuit and the like.

The vehicle automation system 200 here further comprises a free-space detection module, or FrSpcDet module 206, connected to the on-board controller 202 and capable of transmitting thereto a value representative of an unoccupied space in the cabin. One or more inputs of the FrSpcDet module 206 can be connected to the output of one or more devices from the group consisting of an arrangement of optical reflectors distributed on the floor of the cabin and of optical detectors distributed on the ceiling of this cabin, an image capture device associated with an image processing circuit, a floor mat with distributed contactors, a mat of the capacitive type and the like.

In this case, the vehicle automation system 200 further comprises a communication module 208, connected to the on-board controller 202, via which the vehicle automation system 200 can communicate with other automation systems, in particular station automation systems.

Figure 3:
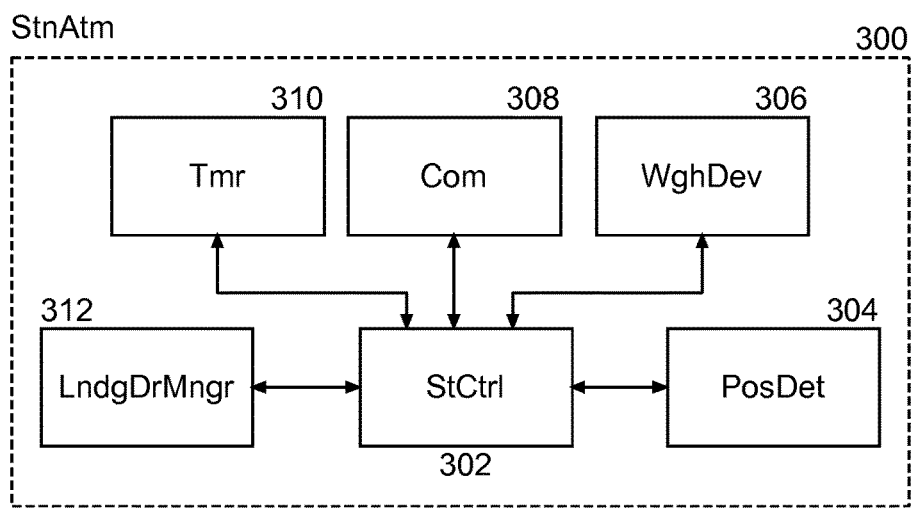
FIG. 3 is an operating diagram of a station automation system intended to be used, for example, in the facility shown in FIG. 1.

Reference is now made to FIG. 3.

It shows one example of an automatic control system intended to be used for a station of a cable transport facility, such as the station 100 in FIG. 1 for example.

The station automation system 300 comprises a station controller 302. The station automation system 300 further comprises a positioning module 304 for positioning the vehicles at the station. In particular, the positioning module 304 is capable of determining the presence of a vehicle at at least some of the station's embarking and/or disembarking areas, where relevant at the stop positions in the station. For example, the positioning module 304 is capable of determining the presence of a vehicle in at least one of the first stop position 112 and the second stop position 114 in FIG. 1. The positioning module 304 is, for example, connected to one or more sensors installed at a respective stop position.

The station automation system 300 further comprises a load module 306 for the vehicles at the station. The load module 306 is capable of determining a weight value for at least some of the vehicles at the station, in particular when they are located in a respective stop position, such as the first vehicle 108 in FIG. 1 for example. This weight value is preferably obtained by measurement. The load module 306 is, for example, connected to one or more devices of the weight indicator type installed on that which guides the vehicles along a path in a station, for example rails.

The station automation system 300 further comprises a communication module 308, connected to the station controller 302, which allows the station automation system 300 to communicate with other automation systems, typically vehicle automation systems, such as that described with reference to FIG. 2 for example.

The station automation system 300 further comprises a timer module 310 connected to the station controller 302. The timer module 310 is capable of transmitting time measurement values to the station controller 302.

Finally, the station automation system 300 comprises a management module 312 for managing arrangements selectively prohibiting embarkation from a terminal, in particular prohibiting passenger access to a vehicle stopped in a respective stop position, typically arrangements of the type of the first landing door arrangement 116 described with reference to FIG. 1. The management module 312 in particular commands the opening and closing of the arrangements in question. Additionally or alternatively, the management module 312 can be configured to additionally command the opening and/or closing of the doors of a vehicle, at least when this vehicle is facing a terminal, in particular in a respective stop position. This command can be direct and sent to an opening device at the station, or indirect, typically sent via the vehicle automation system.

Figure 4:
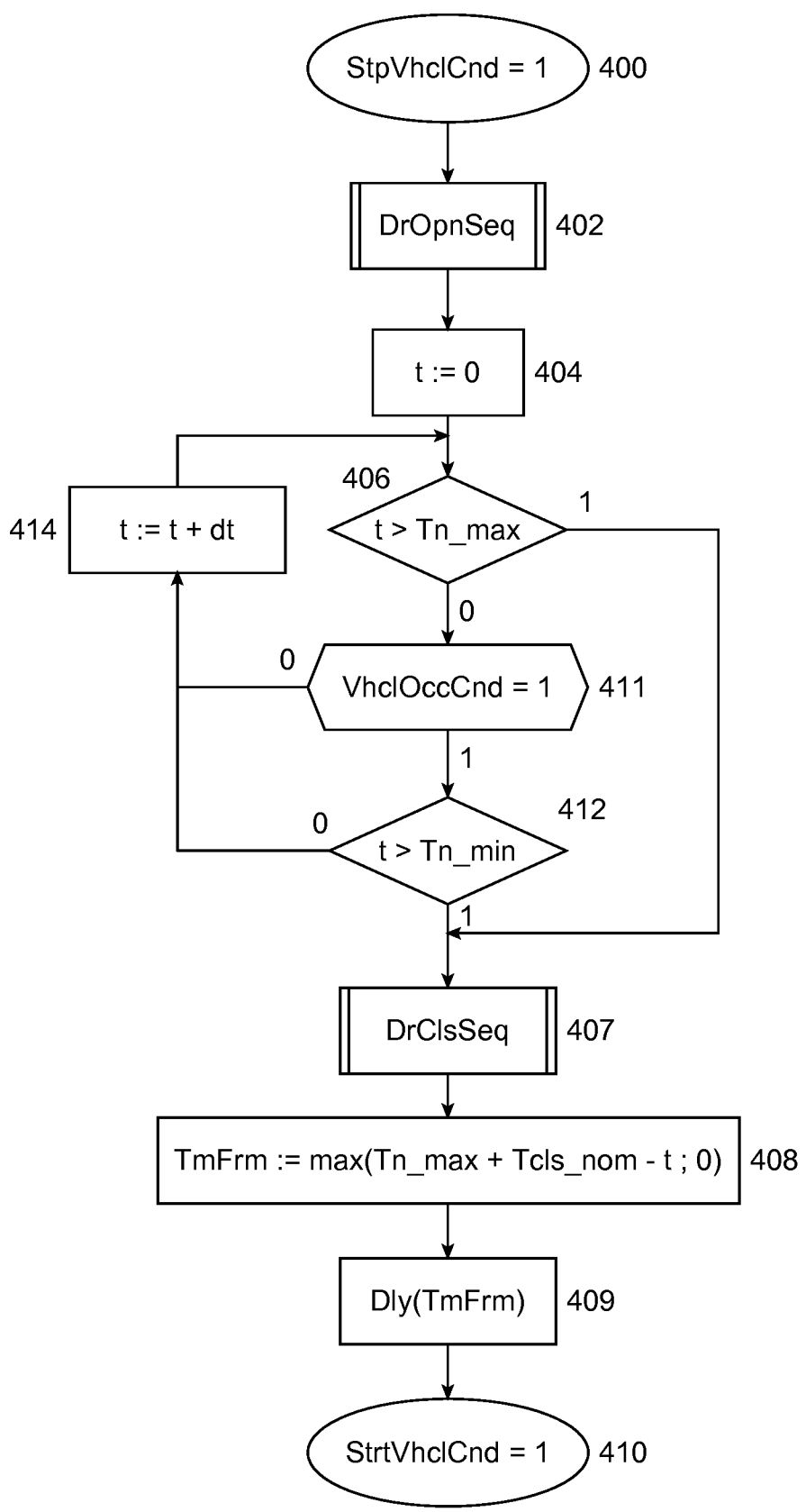
FIG. 4 is a flowchart showing the operation of a control device intended to be used, for example, in the facility shown in FIG. 1.

Reference is now made to FIG. 4.

It shows a mode of operation of a station machine, such as the station automation system 300 in FIG. 3, in a sequence corresponding to a stopping of a vehicle at a terminal in the station, in order for passengers to embark/disembark.

The sequence starts with a step 400 where a condition for stopping a vehicle at the terminal, or StpVhclCnd condition, is satisfied. For example, the condition can relate to stopping the first vehicle 108 in FIG. 1 at the first terminal. The satisfaction of this StpVhclCnd condition implies in particular the satisfaction of a double condition, i.e.:

the presence of a vehicle in the stop position corresponding to the terminal, obtained, for example, from a module of the type of the positioning module 304 in FIG. 3, and the immobility of this vehicle relative to the platform, which can be deduced from a measurement of the vehicle's speed, obtained, for example, from a machine on board this vehicle.

The StpVhclCnd condition can be checked, at least partially, by a machine on board the vehicle, for example the vehicle automation system 200 in FIG. 2. The information regarding this check can be transmitted to the station machine.

In the next step 402, the machine runs a sub-sequence intended to allow access to the vehicle for users present on the platform, or embarkation, and reciprocally to allow access to the platform for passengers in the cabin, or disembarkation. This is typically an open door sequence, or DrOpnSeq sequence. This DrOpnSeq sequence comprises a command to open the devices prohibiting access to the vehicle from the platform, in particular landing doors, for example the first landing door arrangement 116 in FIG. 1. This DrOpnSeq sequence can further comprise a command to open vehicle doors, directly sent to an opening device at the station or, indirectly, to the vehicle automation system.

Once the DrOpnSeq sequence is complete, the machine starts a time period measurement, for example by controlling a device similar to the timer 310 in FIG. 3. The start of this measurement is shown here by setting a variable t forming a time counter to the value 0 ("zero"), in step 404. This corresponds to the beginning of an embarking/disembarking period.

In the next step 406, it is checked whether the time period elapsed since the start of the measurement in step 404 is greater than or equal to a first time parameter Tn_max. In practice, the timer 310 can provide the machine with the time elapsed since this timer 310 received the measurement command in real time. This condition is shown here by the fact that the time counter t is greater than or equal to the first time parameter Tn_max.

If this is the case, then in a step 407, the machine runs a sequence intended to prohibit embarkation/disembarkation. This is the end of the embarking/disembarking period.

This is typically a close door sequence, or DrClsSeq sequence. This DrClsSeq close door sequence generally comprises a command to emit an audible and/or visual announcement and a subsequent command to close the landing doors. Additionally or alternatively, this DrClsSeq sequence can further comprise a command to close the vehicle doors directly sent to a closing device at the station or, indirectly, to the vehicle machine. This sequence has a nominal duration, or duration Tclos_nom, which is another time parameter of the facility.

Then, the machine stores, in this case in a variable TmFrm, a value corresponding to the maximum of:

the difference between, on the one hand, the sum of the first time parameter Tn_max and of the nominal duration Tclos_nom of the close door sequence and, on the other hand, the value of the time counter t;

the zero value.

When step 407 follows the test 406, the value of the variable TmFrm calculated in step 408 is zero.

Once this sequence in step 408 is complete, the machine implements a time delay, the duration whereof corresponds to the value of the variable TmFrm stored in memory in step 408, which corresponds to step 409. In the case where step 407 follows step 406, this time delay is zero. This is the case when the time elapsed in step 406 is greater than or equal to the first time parameter Tn_max.

Once the time delay in step 409 is complete, the stop vehicle sequence can be completed. The vehicle is ready to be restarted, at least as regards the part of the station machine that controls the terminal. This corresponds to the satisfaction of a start condition, or condition StrtVhclCnd. For example, a start command is transmitted by the station machine to the vehicle machine.

A time delay corresponding to the first time parameter Tn_max is recognised in the succession of the test in step 406 and of the sequence in step 407. Upon expiry of a time delay period of duration Tn_max from the end of the open door sequence in step 402, the machine runs the close door sequence in step 407. Moreover, the vehicle is ready to leave immediately after this closing, since the duration of the additional time delay provided for in step 409 is zero in this case. This time delay period of duration Tn_max corresponds to an embarking/disembarking period for the vehicles at the station according to a nominal time delay.

If the test in step 406 is negative, i.e. in the case where the time elapsed since the end of the open door sequence in step 402 is less than the value of the first time parameter Tn_max, then the machine checks a condition relating to a variable representative of an occupancy of the vehicle, or condition VhclOccCnd. The variable relates to a measurement taken on the vehicle. For example, this condition relates to a comparison between an occupancy measurement and a threshold value.

If this condition VhclOccCnd is satisfied, then the machine checks that the time period elapsed since the end of the open door sequence in step 402 is greater than a second time parameter Tn_min. The value of this second time parameter Tn_min is less than the value of the first time parameter Tn_max. This is represented by step 412, wherein it is checked whether the time counter t is greater than the value of the second time parameter Tn_min.

If this is the case, then the machine proceeds to step 407, where it commands the embarking/disembarking period to end, and then proceeds to the next step 408. Here, the value stored in the variable TmFrm corresponds to the difference between the second time parameter Tn_max and the time elapsed since the end of the open door sequence in step 402. This value TmFrm thus corresponds to a time advance with respect to a time delay period, the duration whereof corresponds to the first time parameter Tn_max, from which advance is deducted, where appropriate, a delay in the sequence DrClsSeq with respect to the nominal duration Tcls_nom of this sequence. In step 407, the machine prohibits access to the vehicle in advance relative to the first time parameter Tn_max. This advanced prohibition is the result of the evaluation of the condition VhclOccCnd relative to a variable representative of the vehicle occupancy.

Following step 408, in step 409, the machine implements a time delay, the duration whereof corresponds to the value TmFrm, i.e. the advance relative to the first time parameter Tn_max, minus a potential delay in the execution of the sequence DrClsSeq. At the end of this time delay, the time elapsed since the doors were opened, at the end of the sequence 402, corresponds to the first time parameter Tn_max, plus the nominal duration of the sequence DrClsSeq. The embarking/disembarking period corresponding to the first time parameter Tn_max and the close door sequence DrClsSeq in step 407 are reached again. The machine then proceeds to step 410.

If the test in step 412 is negative, then, in the next step 414, a time delay of duration dt is applied before returning to the test in step 406. In other words, if the occupancy condition in step 411 is satisfied, but the time elapsed since the end of the open door sequence in step 402 remains less than the second time parameter Tn_min, then the machine applies a time delay, in particular before checking this occupancy condition again. The duration dt of the time delay in step 414 corresponds to a time increment. This duration dt can be very small or even negligible compared to the values of the first time parameter Tn_max and of the second time parameter Tn_min. This allows the sequence in FIG. 4 to run in near real time.

In the case that the test in step 411 is negative, i.e. if the vehicle occupancy condition is not satisfied, then the machine returns to the time delay in step 414.

A time delay corresponding to the second time parameter Tn_min is recognised in the succession of the test in step 412 and the sequence in step 414. The machine does not run the close door sequence in step 407 before this time delay has expired. Everything works in such a way that the machine reacts to the evaluation of the condition VhclOccCnd after expiry of a minimum period of access to the vehicle, which started at the end of step 402, and the duration whereof corresponds to the second time parameter Tn_min.

The second time parameter Tn_min corresponds to a minimum time during which access to the vehicle is allowed for embarkation/disembarkation. The first time parameter Tn_max corresponds to a maximum time during which access to the vehicle is allowed for embarkation/disembarkation.

Before the expiry of a time delay corresponding to the first time parameter Tn_max, the doors in step 407 are commanded to close as soon as the condition VhclOccCnd relating to the occupancy of the vehicle is satisfied, provided that the time delay corresponding to the second time parameter Tn_min has expired.

The values of the first time parameter Tn_max and of the second time parameter Tn_min, as well as of the additional parameter Tcls_nom, are determined as nominal operating times. A value of the first time parameter Tn_max is typically in the order of a few tens of seconds, for example comprised between 12 and 40 seconds. A value of the second time parameter Tn_min is typically in the order of about ten seconds, for example comprised between 5 and 15 seconds. A value of the additional time parameter Tcls_nom is typically in the order of a few seconds, for example comprised between 1 and 3 seconds.

The advance TmFrm, compared to the nominal door opening time Tn_max, with which the close door sequence in step 407 is run, is used here in the time delay step 409. In other words, the start vehicle condition StrtVhclCnd in step 410 is only satisfied after the expiry of a time delay, the duration whereof corresponds to the first time parameter Tn_max, plus the duration of the sequence DrClsSeq, regardless of whether or not the close door sequence in step 407 has been run in advance, i.e. before the expiry of a period corresponding to the first time parameter Tn_max.

The embarking/disembarking period is respected, which can be seen as a maximum operating time. A nominal timing of the vehicles is thus maintained along the transport paths. The time saved in relation to this maximum operating time, i.e. the advance TmFrm, can be used to deal with operational contingencies. A typical operational contingency involves the inability to close the doors due to a passenger blocking them. This type of contingency, like others, mainly occurs during periods of high traffic. In the event of crowds, the doors are closed in advance.

The nominal timing is respected all the more so since the time delay step 409 procures an operating time margin, which makes absorbing delays linked to these operating contingencies possible without any consequences on the timing of the vehicles in the facility.

Figure 5:
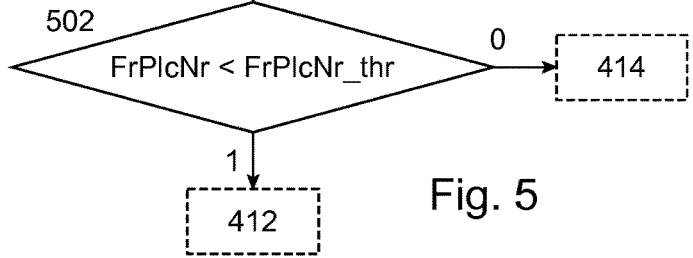
FIG. 5 is a flowchart showing, in detail, step 411 in FIG. 4, according to a first embodiment.

Reference is now made to FIG. 5.

It shows a first implementation of step 411 in FIG. 4 relating to the satisfaction of an occupancy condition for the vehicle.

In step 500, which follows step 406, the machine determines a value representative of a number of available places in the vehicle cabin, or value FrPlcNr. Alternatively, this could be a rate.

In the next step 502, the machine compares the value FrPlcNr to a threshold value FrPlcNr_thr. If the value FrPlcNr is less than the threshold value FrPlcNr_thr, then the next step 412 is carried out. The machine will be able to run the close door sequence in step 407, then save the time advance TmFrm to the nominal value Tn_max in step 408. Otherwise, the machine applies a time delay for a time period dt in step 414.

In this case, the machine runs the close door sequence as soon as the number of available places in the cabin falls below a threshold value FrPlcNr_thr for available places, provided that access to the vehicle has been authorized beyond a minimum operating time defined by the value of the second time parameter Tn_min (condition in step 412). This means advancing the closing of the doors with respect to the embarking/disembarking period, or the maximum operating time, corresponding to the value of the first time parameter Tn_max.

Figure 6:
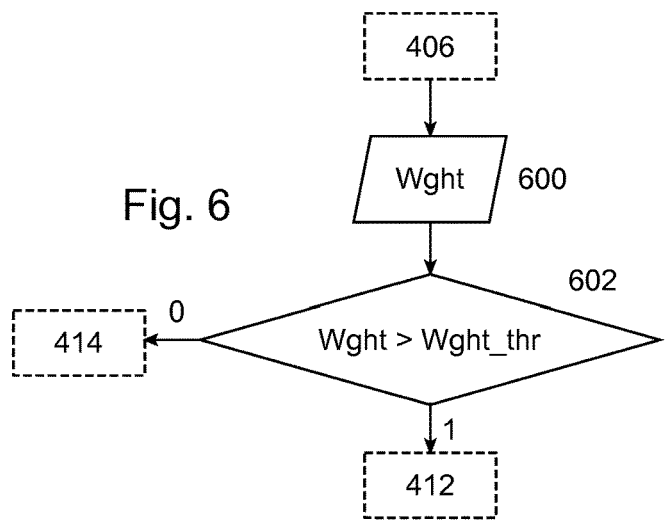
FIG. 6 is a flowchart showing, in detail, step 411 in FIG. 4, according to a second embodiment.

Reference is now made to FIG. 6.

It shows a second implementation of step 411 in FIG. 4 relating to the verification of an occupancy condition for the vehicle.

In step 600, which follows step 406, the machine obtains a measurement value, representative of a current weight of the cabin of the vehicle, or of the vehicle itself. This value can be obtained from a module similar to the load module 306 in FIG. 3.

In the next step 602, the machine compares this measured weight value to a threshold weight value Wght_thr. If the weight of the cabin is greater than the threshold value Wght_thr, then the next step 412 is carried out. The machine will be able to run the close door sequence in step 407, then save the time advance TmFrm in step 408. Otherwise, the machine applies a time delay of a time period dt in step 414.

In this case, the machine commands the doors to close as soon as a cabin weight Wght is measured that is greater than a threshold weight value Wght_thr, provided that access to the cabin has been authorised beyond the minimum operating time defined by the value of the second time parameter Tn_min (condition in step 412). This threshold weight value Wght_thr is determined as an operating threshold, rather than as a safety threshold. In other words, this threshold value Wght_thr is determined in such a way as to take into account the regularity of the timing of the vehicles of the facility and passenger comfort, rather than as a safety-related limit value, linked, for example, to a maximum permitted weight for a vehicle. This threshold value Wght_thr can be related to a number of passengers, for example by considering an average weight per passenger.

Figure 7:
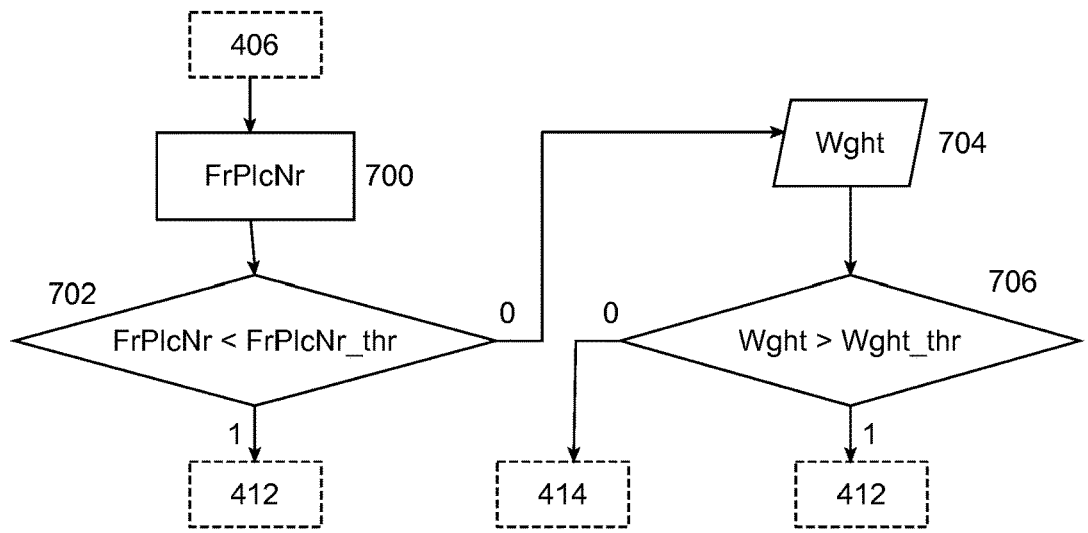
FIG. 7 is a flowchart showing, in detail, step 411 in FIG. 4, according to a third embodiment.

Reference is now made to FIG. 7.

It shows a third implementation of step 411 in FIG. 4.

Steps 700 and 702 are similar to steps 500 and 502 in FIG. 5, with the exception that when the value of the number of free places FrPlcNr is greater than the threshold value FrPlcNr_thr, the machine implements steps 704 and 706, which are respectively similar to steps 600 and 602 in FIG. 6.

In this embodiment, the machine runs the close door sequence in step 407 as soon as the number of available places in the cabin falls below the threshold value FrPlcNr_thr or as soon as the weight of this cabin exceeds the threshold value Wght_thr, provided that, in each case, the opening time of these doors has exceeded a minimum duration Tn_min (condition of step 412).

Figure 8:
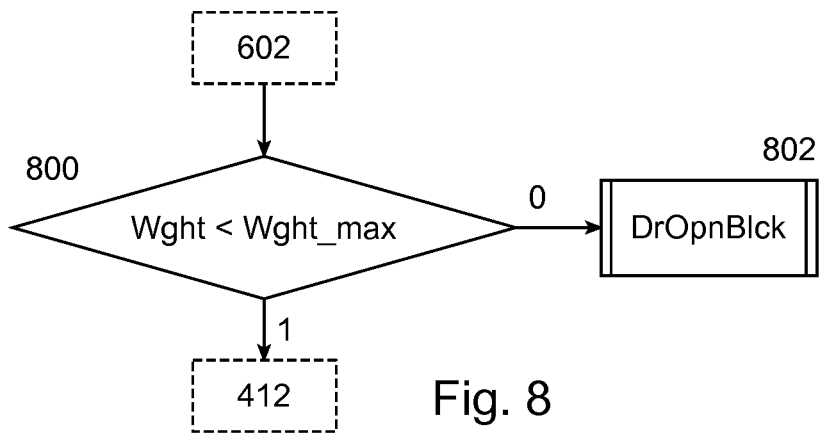
FIG. 8 is a flowchart showing an enhancement of step 411.

Reference is now made to FIG. 8.

It shows an enhancement of the embodiment shown in FIG. 6. After the test in step 602, if the weight of the cabin is greater than the threshold value Wght_thr, the machine compares the value of the weight of the vehicle to a maximum weight value, or value Wght_max, in a step 800. If the measured weight is less than the maximum weight Wght_max, then the machine runs the close door sequence in step 407 and records an advance value TmFrm in step 408, in the event that the condition in step 412 is satisfied.

Otherwise, the machine runs a sequence to block the doors in the open position in step 802. This sequence can comprise in particular a command to emit a safety signal or an invitation to the last passengers to embark to disembark.

In this enhancement, once the weight of the cabin or of the vehicle has fallen back below the maximum weight Wght_max, the doors can be closed again, and the vehicle allowed to leave its stop position (step 410) after expiry of the time delay related to respecting the timing of the vehicles (step 409).

The close door sequence is not triggered unless the variable representing vehicle occupancy, in this case the weight of the cabin, exceeds a limit value, which is greater than the threshold value.

The maximum weight value Wght_max is a safety limit value, defined in itself as a function of the vehicle's capacity, rather than an operational limit value. For example, it is defined by standards. This value can be deduced from a seating capacity and a cabin floor space, considering a minimum space allowed per passenger and an average passenger weight.

This allows the facility to be optimally sized based on the maximum weight value Wght_max, since the test in step 800 ensures that the weight of the vehicles on the line does not exceed this maximum value.

Preferably, the threshold weight value Wght_thr and the maximum weight value Wght_max, relative to the vehicle or to the cabin thereof, are determined in relation to one another in order to prevent the block door sequence in step 802 from being run, at least under normal operating conditions. The aim is to not penalise the timing of the vehicles and, ultimately, the efficiency of the facility's operation and the availability thereof.

The values of the first and second time parameters Tn_min and Tn_max, relating to the minimum and maximum door opening times, of the parameter FrPlcNr_thr relating to the threshold of available places in the vehicle, as well as the operating and safety thresholds regarding the weight of the vehicle represented by the threshold weight Wght_thr and maximum weight Wght_max values, are determined in relation to one another in order to ensure that the facility operates smoothly, efficiently, robustly and safely. In particular, the values of the parameters FrPlcNr_thr and threshold weight Wght_thr correspond to threshold values for vehicle occupancy. They are determined in such a way as to allow for a few additional passengers to embark during the close door sequence, typically during the transmission of an audible signal preceding the closing of these doors, without exceeding the nominal capacity of the vehicle, as regards the places available therein, or the maximum weight value Wght_max.

Figure 9:
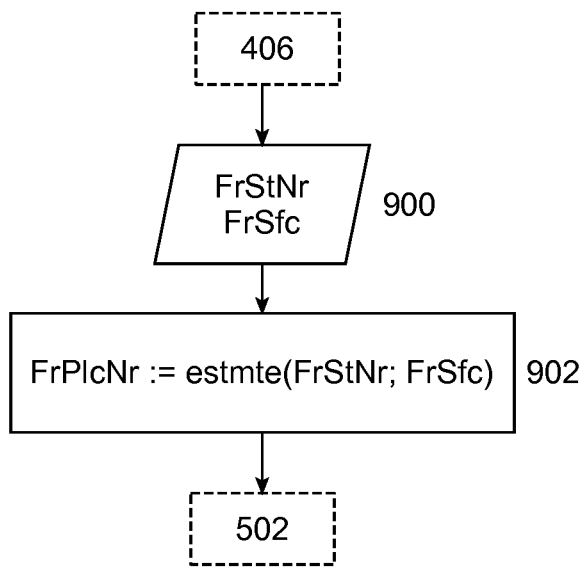
FIG. 9 is a flowchart showing another enhancement of step 411.

Reference is now made to FIG. 9.

It shows, in detail, a first embodiment of step 500 in FIG. 5, wherein the machine determines a number of available places in the vehicle.

In a step 900, the machine receives a value representative of a number of unoccupied seats in the cabin, or value FrStNr, and a value representative of a free floor space in this cabin, or value FrSfc. These values can originate from the vehicle machine, for example from the modules FrStDet 204 and FrSpcDet 206 respectively.

In the next step 902, the machine determines the value FrPlcNr as a result of invoking an estimation function using these values.

The values of step 900 are received each time the occupancy condition VhclOccCnd is evaluated in step 411, regularly, at the end of each time delay of duration dt (step 414). These values can be measured regularly, with a time interval consistent with the time delay in step 414. In practice, these values are thus obtained in real time, at least over a time period corresponding to an open state of the doors, between the end of step 402 and the beginning of step 407.

Figure 10:
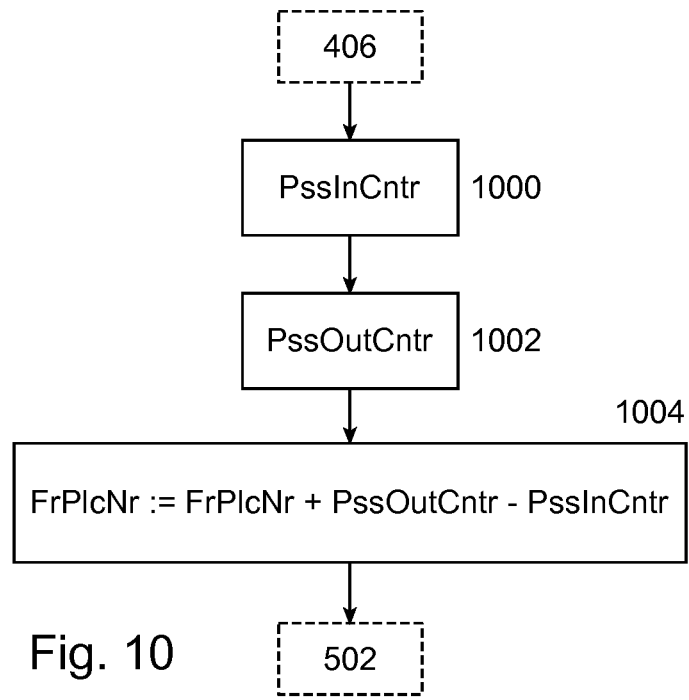
FIG. 10 is a flowchart showing an alternative embodiment to the enhancement in FIG. 9.

Reference is now made to FIG. 10.

It shows, in detail, a second embodiment of step 500 in FIG. 5, wherein the machine determines a number of available places in the vehicle.

The machine has already received a value FrPlcNr relating to the number of available places before the open door sequence in step 402. This value is, for example, calculated by the vehicle machine using the modules FrStDet 204 and FrSpcDet 206.

In step 1000, which follows step 406, the machine queries a first counter, relating to the number of passengers having embarked since the doors were opened.

In the next step 1002, the machine queries a second counter, relating to the number of passengers having disembarked since the doors were opened.

In the next step 1004, the machine determines the value FrPlcNr as being the difference between the sum of the initial value FrPlcNr and the number of passengers having disembarked, and the number of passengers having embarked.

As opposed to the preceding embodiments, in particular that shown in FIG. 9, where the value FrPlcNr is measured in near real time throughout the door opening time, in this case this value FrPlcNr is derived from a single estimate or measurement.

Figure 11:
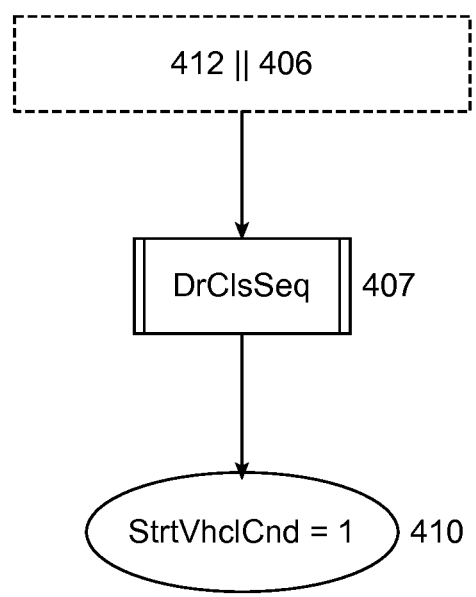
FIG. 11 is a flowchart showing an alternative embodiment to the mode of operation in FIG. 4.

Reference is now made to FIG. 11.

It shows an alternative embodiment to the mode of operation of the station machine shown in FIG. 4. According to this alternative embodiment, the starting condition in step 410 is satisfied, at least with respect to the station machine controlling the terminal, as soon as the prohibit access sequence in step 407 ends, regardless of whether this sequence was triggered in advance with respect to the first time parameter Tn_max (following step 412) or not (following step 406). This alternative embodiment is more particularly suitable in the case of a facility where compliance with the timing of the vehicles is managed other than by the station machine, or the part of this station machine that controls the terminal. This alternative operating embodiment retains the advantages of prohibiting access to the vehicle in advance, in particular of providing a time window for absorbing at least part of a delay caused by an operational contingency.

The invention is not limited to the embodiments described hereinabove, which are provided by way of example only. The invention encompasses all alternative embodiments that can be envisaged by a person skilled in the art. In particular:

Terminals have been described, each corresponding to a section of path where the vehicles stop in order to for passengers to embark and/or disembark, for example the first stop position 112 in FIG. 1. What is important is that each terminal is provided facing a section of path where passengers are likely to embark or disembark from the vehicles, regardless of whether embarkation/disembarkation occurs when the vehicle is stationary or travelling at a reduced speed along the section in question.

Landing door arrangements have been described as devices capable of being actuated in order to selectively allow and prohibit access to the vehicles from a terminal. More generally, any device capable of carrying out this function can be used. In particular, the type of device used can vary depending on whether embarkation or disembarkation takes place on an extended section of the platform, for example in the event that vehicles are travelling at a reduced or restricted speed, or in the event that the vehicles are stationary.

Terminals have been described as each comprising a landing door arrangement. A terminal can comprise a plurality of landing door arrangements. A plurality of terminals could also share one and the same landing door arrangement.

At least some of the modules described in relation to a station machine can instead be, at least partially, integrated into a vehicle machine, depending on the embodiments considered. This is in particular the case for the weighing module which, in particular when the weighing concerns the cabin and/or when a weight indicator is inserted between the vehicle's hanger and the cabin thereof, can be integrated into the vehicle automation system 200 rather than into the station automation system 300. For accuracy purposes, the weight of the cabin is preferably measured, rather than that of the whole vehicle. However, use of the weight of the vehicle as a whole is not excluded.

The modules responsible for detecting unoccupied seats, for example the module FrStDet 204 in FIG. 1, and for detecting free space, for example the module FrSpcDet 206 in FIG. 1, can be combined into one and the same module, for example a module capable of determining a number of free places in a cabin.

The modules described with reference to FIGS. 2 and 3 can be replaced, at least in part, by communication functions for obtaining relevant information from devices external to the vehicles and/or to the station.

More generally, the sequence described with reference to FIG. 4 is not limited to the case of vehicles that stop for embarkation/disembarkation. The initial condition StpVhclCnd can be satisfied as soon as a vehicle is located in a section of path corresponding to a terminal. This condition can be complemented by the fact that the vehicle must respect a speed limit in relation to the platform.

Terminals intended to be used by passengers for embarking and disembarking have been described. At least some of the terminals can be exclusively dedicated to either embarkation or disembarkation. The station machine can thus be arranged such that a minimum door opening time delay Tn_min is satisfied at the passenger disembarkation terminals. For the embarkation terminals, the station machine can instead omit the satisfaction of this minimum time delay Tn_min.

The vehicle doors or the landing doors can be opened without the intervention of the vehicle automation system or station automation system, for example by a purely mechanical release. However, machine control can be maintained for the closing of either the landing doors or the vehicle doors.

Passenger embarkation and disembarkation at a terminal has been described as being controlled by both a device attached to the terminal, typically a landing door arrangement, and a device attached to the vehicle, typically the doors thereof. The invention can be envisaged without any device attached to the terminal, the station machine thus controlling the vehicle doors, at least with respect to the closing thereof. Similarly, the station machine is not required to control the vehicle doors if it already controls an access device attached to the terminal. Moreover, the device attached to the terminal does not necessarily prohibit access to the vehicle in a physical manner. Alternatively or additionally, one or more signaling devices, such as colored lights for example, can be used.

A second fixed time parameter Tn_min has been described. Alternatively, the value of this parameter could vary depending on the vehicle considered, for example as a function of the load thereof.

A station machine responsible for checking a maximum weight criterion has been described. Since this is a safety-related function of the transport facility, this check can be carried out by a separate machine.

The threshold weight value Wght_thr can be determined as a function of a maximum capacity that the vehicle must not exceed for safety reasons, for example the maximum weight value Wght_max, even if the machine does not check that this maximum capacity has not been exceeded. In such a case, the threshold weight value Wght_thr can be given a safety factor.

The invention has been described in the specific case of a cable car-type facility. The invention applies to any type of cabled passenger transport facility that is, in particular:

of the aerial carriage type, in particular of the single-cable type (one track and hauling cable), twin single-cable type (two track and hauling cables) or dual-cable type (one or more hauling cables and one or more track cables);

of the cable railway type;

of the disengageable type, i.e. including one or more hauling cables driven at a uniform speed and vehicles hauled by these cables that can disengage to stop at and/or reduce their speed at the station for embarkation/disembarkation purposes;

of the pulsed type, i.e. the vehicles whereof are constantly attached to the one or more hauling cables, the speed of these cables being variable to allow vehicles to stop at a station;

of the back-and-forth type.

The invention can also be seen as a method for controlling a cable transport facility.

The invention claimed is:

1. A control device for a cable transport facility of the type comprising at least one controller capable of organizing an embarking period (Tn_max) of a nominal duration for vehicles at a station, said embarking period (Tn_max) ending with access to the vehicle being prohibited, wherein the controller comprises an input for receiving at least one variable (FrPlcNr, Wght) representative of a vehicle occupancy, and the controller is arranged to react to the receipt of such a variable (FrPlcNr, Wght) during the embarking period (Tn_max) by comparing it with a threshold value (FrPlcNr_thr, Wght_thr) and by triggering the prohibition on access to the vehicle in advance, before the end of the embarking period (Tn_max), as a function of a result of the comparison between said variable (FrPlcNr, Wght) and the threshold value (FrPlcNr_thr, Wght_thr).

2. The device according to claim 1, wherein the controller is arranged to react to the receipt of said variable (FrPlcNr, Wght) after expiry of a minimum period (Tn_min) of access to the vehicle.

3. The device according to claim 1, wherein said variable (FrPlcNr, Wght) is received in real time.

4. The device according to claim 1, wherein said variable (FrPlcNr, Wght) partially results from at least one measurement (FrStNr, FrSfc, Wght) taken on the vehicle.

5. The device according to claim 1, wherein the variable (FrPlcNr, Wght) representative of vehicle occupancy comprises a variable (FrPlcNr) representative of a number of free or occupied places in the vehicle.

6. The device according to claim 5, wherein the variable (FrPlcNr) representative of the number of free or occupied places in the vehicle results from at least one measurement of a free or occupied space (FrSfc), respectively, in the vehicle and from a detection of free or occupied seats (FrStNr), respectively, in this said vehicle.

7. The device according to claim 6, wherein the measurement of the free or occupied space (FrSfc) results from one or more devices from the group consisting of an arrangement of: optical reflectors distributed on the floor of the vehicle, optical detectors distributed on the ceiling of said vehicle, an image capture device associated with an image processing circuit, a floor mat with distributed contactors, and a mat of the capacitive type.

8. The device according to claim 6, wherein the detection of free or occupied seats (FrStNr) in the vehicle results from one or more devices from the group consisting of: weighing devices installed in the seats, dry contacts disposed in the seats, an optical sensor, and an image capture device associated with an image processing circuit.

9. The device according to claim 1, wherein the variable (FrPlcNr, Wght) representative of vehicle occupancy comprises a variable (Wght) representative of a weight of the vehicle.

10. The device according to claim 1, wherein the threshold value (FrPlcNr_thr, Wght_thr) corresponds to a threshold vehicle occupancy value.

11. The device according to claim 1, wherein the threshold value (FrPlcNr_thr, Wght_thr) is determined, at least in part, as a function of a safety limit value (Wght_max).

12. The device according to claim 1, wherein the embarking period (Tn_max) occurs according to a first time delay and, when the controller prohibits access in advance (TmFrm) during the first time delay, the machine organises a waiting time of a determined duration after this prohibition on access, the duration of the waiting time being determined as a function of this advance (TmFrm).

13. The device according to claim 12, wherein the duration of the waiting time corresponds to said advance (TmFrm) from which is deducted, where appropriate, a delay in the prohibition on access.

14. The device according to claim 12, wherein at the end of the waiting time, the machine checks that a start condition (StrtVhclCnd) has been satisfied, and generates a start command.

15. The device according to claim 1, wherein the variable (Wght) representative of vehicle occupancy comprises an occupancy value, and the controller is arranged to prohibit access to the vehicle when the occupancy value is greater than the threshold value (Wght_thr).

16. The device according to claim 1, wherein the variable (FrPlcNr) representative of vehicle occupancy comprises a non-occupancy value, and the controller is arranged to prohibit access to the vehicle when the non-occupancy value is less than the threshold value (FrPlcNr_thr).

17. The device according to claim 1, wherein the controller is arranged not to prohibit access to the vehicle as long as the variable (FrPlcNr, Wght) representative of vehicle occupancy is greater than a vehicle occupancy limit value (Wght_max), which is greater than said threshold value (FrPlcNr_thr, Wght_thr).

18. A cable transport facility of the type comprising vehicles and at least one station, the facility further comprising a controller capable of organizing an embarking period (Tn_max) of a nominal duration for the vehicles at said station, said embarking period (Tn_max) ending with access to the vehicle being prohibited, wherein the controller comprises an input for receiving at least one variable (FrPlcNr, Wght) representative of a vehicle occupancy, and in that the controller is arranged to react to the receipt of such a variable (FrPlcNr, Wght) during the embarking period (Tn_max) by comparing it with a threshold value (FrPlcNr_thr, Wght_thr) and by triggering the prohibition on access to the vehicle in advance, before the end of the embarking period, as a function of the result of the comparison between said variable (FrPlcNr, Wght) and the threshold value (FrPlcNr_thr, Wght_thr).

19. A method for controlling a cable transport facility, wherein an embarking period (Tn_max) of a nominal duration is organized for vehicles at a station, this embarking period (Tn_max) ending with access to the vehicle being prohibited, the method comprising:
receiving at least one variable (FrPlcNr, Wght) representative of a vehicle occupancy,
reacting to the receipt of such a variable during the embarking period (Tn_max) by comparing the variable with a threshold value (FrPlcNr_thr, Wght_thr) and by triggering the prohibition on access to the vehicle in advance, before the end of the embarking period (Tn_max), as a function of the result of the comparison between said variable (FrPlcNr, Wght) and the threshold value (FrPlcNr_thr, Wght_thr).

* * * * *